United States Patent
Paulot et al.

(10) Patent No.: US 6,610,443 B2
(45) Date of Patent: Aug. 26, 2003

(54) ONE-PIECE HEADER ASSEMBLY FOR HERMETIC BATTERY TERMINAL FEEDTHROUGH, FILL AND CLOSURE DESIGNS

(75) Inventors: William M. Paulot, Lancaster, NY (US); Dominick J. Frustaci, Williamsville, NY (US); Kenneth L. Grubb, Snyder, NY (US); Harvey A. Hornung, II, Clarence, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 46 days.

(21) Appl. No.: 09/811,903

(22) Filed: Mar. 19, 2001

(65) Prior Publication Data

US 2002/0132163 A1 Sep. 19, 2002

(51) Int. Cl.[7] .................................................. H01M 2/02
(52) U.S. Cl. ........................ 429/181; 429/175; 429/176; 429/180
(58) Field of Search ................................. 429/176, 175, 429/163, 181, 185, 179, 180, 182, 148; 174/50.61, 50.64

(56) References Cited

U.S. PATENT DOCUMENTS

| | | | |
|---|---|---|---|
| 2,861,117 A | 11/1958 | Sindel et al. | |
| 4,324,847 A | 4/1982 | Athearn | 429/181 |
| 4,659,636 A | 4/1987 | Suzuki et al. | |
| 5,104,755 A * | 4/1992 | Taylor et al. | 429/181 |
| 5,250,373 A | 10/1993 | Muffoletto et al. | 429/161 |
| 5,270,133 A | 12/1993 | Baumann, III | |
| 5,288,565 A | 2/1994 | Gruenstern | |
| 5,306,581 A | 4/1994 | Taylor et al. | 429/181 |
| 5,439,760 A | 8/1995 | Howard et al. | 429/94 |
| 5,458,997 A * | 10/1995 | Crespi et al. | 429/219 |
| 5,474,859 A | 12/1995 | Takeuchi et al. | 429/161 |
| 5,716,729 A | 2/1998 | Sunderland et al. | 429/66 |
| 5,770,332 A | 6/1998 | Narukawa et al. | 429/175 |
| 5,776,632 A | 7/1998 | Honegger | 429/185 |
| 5,896,647 A | 4/1999 | Shkuratoff | 29/623.2 |
| 5,926,362 A | 7/1999 | Muffoletto et al. | |
| 5,958,088 A | 9/1999 | Vu et al. | |
| 6,004,693 A | 12/1999 | Fukuda et al. | |
| 6,010,803 A | 1/2000 | Heller, Jr. et al. | 429/175 |
| 6,040,084 A | 3/2000 | Kurasawa et al. | |
| 6,048,642 A | 4/2000 | Woolsey | |
| 6,265,102 B1 | 7/2001 | Shrim et al. | |
| 6,334,879 B1 | 1/2002 | Muffoletto et al. | |
| 6,445,948 B1 | 9/2002 | Somdahl et al. | |
| 6,498,951 B1 | 12/2002 | Larson et al. | |
| 2001/0049057 A1 | 12/2001 | Frustaci et al. | |
| 2003/0040781 A1 | 2/2003 | Larson et al. | |

FOREIGN PATENT DOCUMENTS

| | | |
|---|---|---|
| EP | 06181069 | 6/1994 |
| EP | 10199493 | 7/1998 |
| EP | 0 928 035 A1 | 7/1999 |
| GB | 1 468 120 | 10/1975 |
| JP | 406068861 | 3/1994 |
| WO | WO 9210859 | 6/1992 |
| WO | WO 01/82393 A2 | 11/2001 |

* cited by examiner

*Primary Examiner*—Stephen Kalafut
*Assistant Examiner*—Raymond Alejandro
(74) *Attorney, Agent, or Firm*—Michael F. Scalise

(57) ABSTRACT

The present invention is directed to an electrochemical cell having plate electrodes housed inside mating "clam shell" casing components. When mated together, the casing components are form-fitting with respect to the internal battery structure so as to reduce the overall size of the electrochemical package. A one piece header containing both a glass-to-metal seal opening for a terminal lead and an electrolyte fill opening is used in conjunction with the clam shell casing.

15 Claims, 7 Drawing Sheets

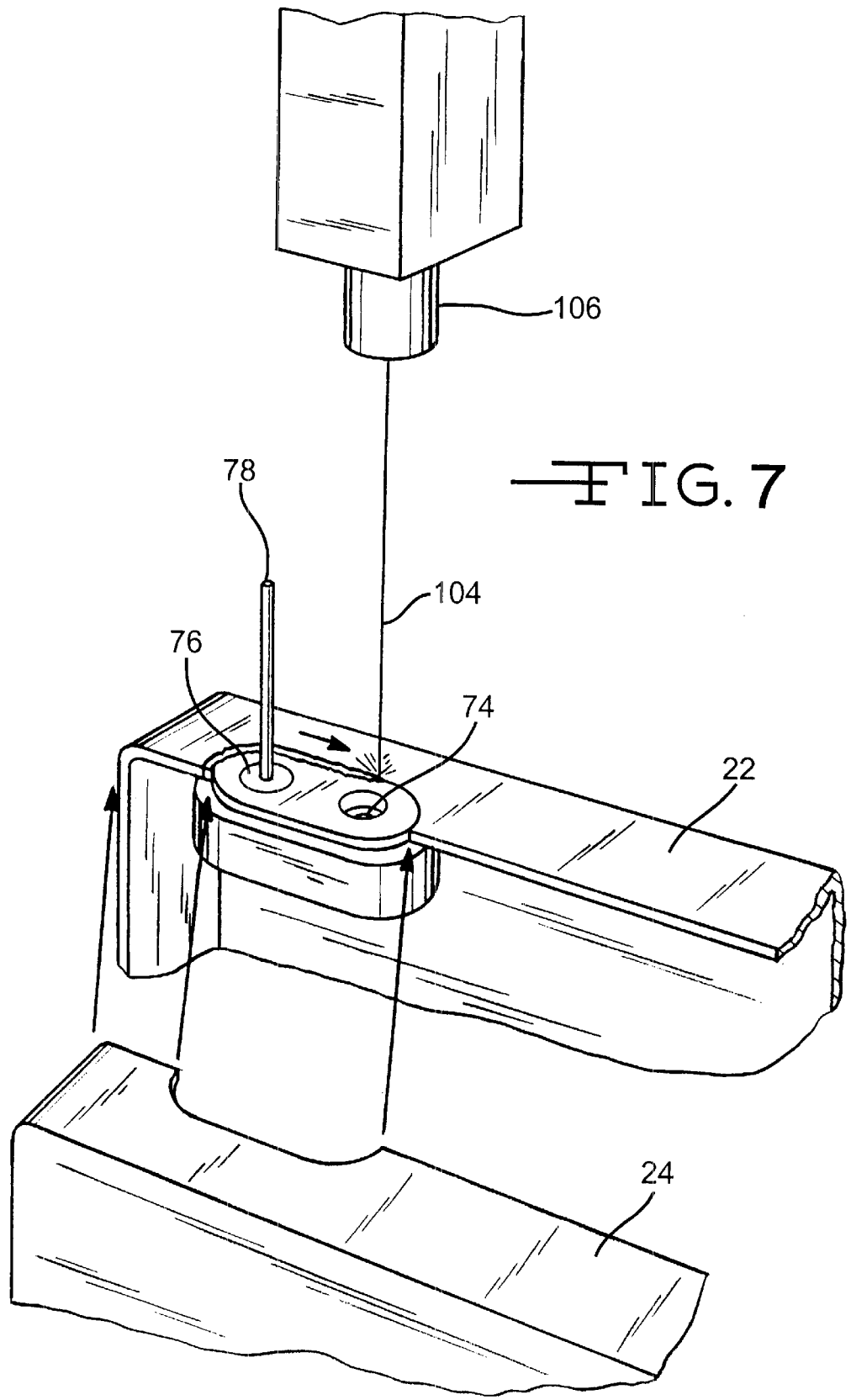

ONE-PIECE HEADER ASSEMBLY FOR HERMETIC BATTERY TERMINAL FEEDTHROUGH, FILL AND CLOSURE DESIGNS

BACKGROUND OF THE INVENTION

1. Field of the Invention

The present invention relates to an improvement in electrochemical cell designed by enhancing manufacturing of a battery case, particularly a clam shell variety. A clam shell casing comprises two plate-shaped members, each having a surrounding rim mated to form the enclosure. More specifically, the invention is directed to a one piece lid or header design containing a hermetic glass to metal seal (GTMS) for a terminal feed through and an electrolyte filling port. While particularly suitable for clam shell casing designs, the present one-piece lid is also useful other with casing constructions as well.

2. Prior Art

In prior and current product lines, the design of electrochemical cells includes a lid with separate ferrules or openings for providing a terminal pin feedthrough, and an electrolyte fill and closure mechanism. Designs for these functions usually consist of a lid, GTMS ferrule, and an electrolyte fill ferrule which are welded together to form a subassembly. This subassembly is further manufactured by having the GTMS inserted into its ferrule and the completed assembly is then welded into a battery case of various configurations. The battery is filled with electrolyte via the fill ferrule or area, and the fill mechanism is welded shut. In this embodiment, there are three components in the lid subassembly requiring four welds for completion.

Another prior art technique requires that the lid be of sufficient thickness to facilitate glassing and installing a fill closure directly into the lid without the provision of ferrules. However, this method has distinct disadvantages since the entire lid must be of increased thickness which in turn reduces the available internal volume of the cell. The prior art describes these various configurations.

For example, JP 406068861A shows a lid for a lithium battery which has a terminal feedthrough, a fill port, and a GTMS provided directly into the cell lid with no ferrules. The battery does not appear to be of a clam shell type. The thin case design of the clam shell would make adaptation of this technology very expensive and moreover, would not be adaptable to other battery configurations.

WO 92/10859 shows an electrochemical cell lid with a fill port as well as a terminal feedthrough. The GTMS is provided with a ferrule. However, while the fill port does not have a ferrule, there is an integrally machined boss portion for supporting a plug. Again, the casing is of a conventional prismatic shape, and not of a clam shell type. This type of fill arrangement is unsuitable for use with a clam shell design and further shows the need for the current invention.

U.S. Pat. No. 5,306,581 to Taylor et al. relates to a battery with a weldable terminal feedthrough including an insulator welded to an aperture in the header. The fill port includes a shaped portion of the lid extending downwardly into the interior of the casing and an integral upstanding ring surrounding the fill plug. Again, adaptation of this design to a clam shell case would be difficult, and resultantly very expensive.

Thus, as previously stated, the problem with the prior art lid or header designs is that a number of pieces need to be assembled and welded to create a hermetically sealed battery terminal feedthrough, and fill port. The new design, the subject of the current patent application, reduces the number of pieces required for a casing lid or header from three to one and reduces the number of welds required from four to two. The new design allows for greater flexibility in battery design while enhancing cell volumetric efficiency.

SUMMARY OF THE INVENTION

Accordingly, the present invention is directed to an electrochemical cell having plate electrodes housed inside mating "clam shell" casing components. A one piece metallic lid or header design is used in conjunction with the clam shell case, the lid containing both a hermetic glass-to-metal seal for a terminal lead and a filling port. When mated together, the casing components are form-fitting with respect to the internal battery structure so as to reduce the overall size of the electrochemical package.

The foregoing and additional advantages and characterizing features of the present invention will become clearly apparent upon reading the ensuing description together with the included drawings wherein:

BRIEF DESCRIPTION OF THE DRAWINGS

FIG. 7 shows a perspective view of an embodiment of the clam shell case in which the battery header assembly is being installed by welding using a laser source.

BEST MODE FOR CARRYING OUT THE INVENTION

Figure 3:
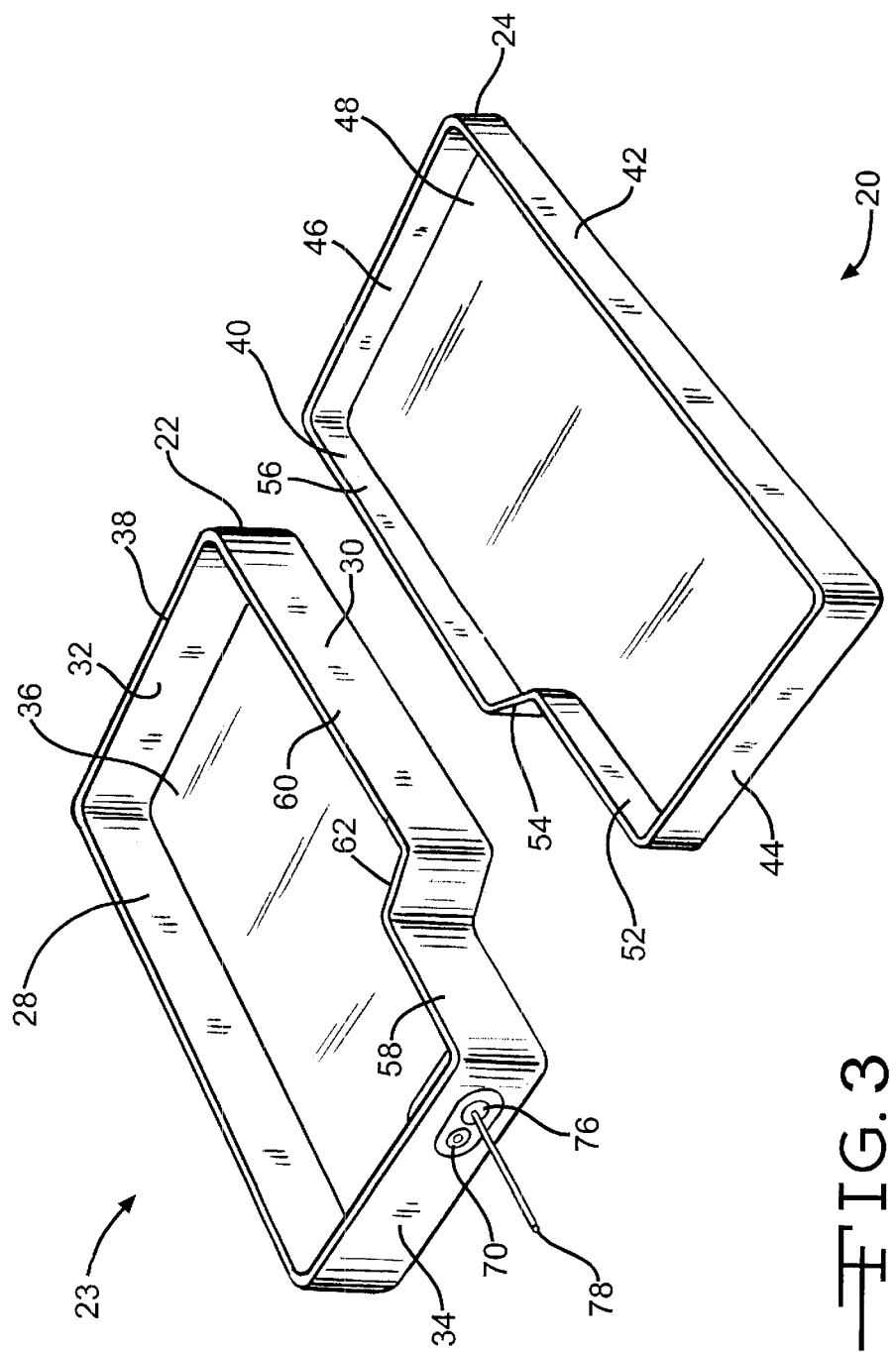
FIG. 3 is a perspective view of an embodiment of the clam shell halves of the battery casing.
Figure 4A:
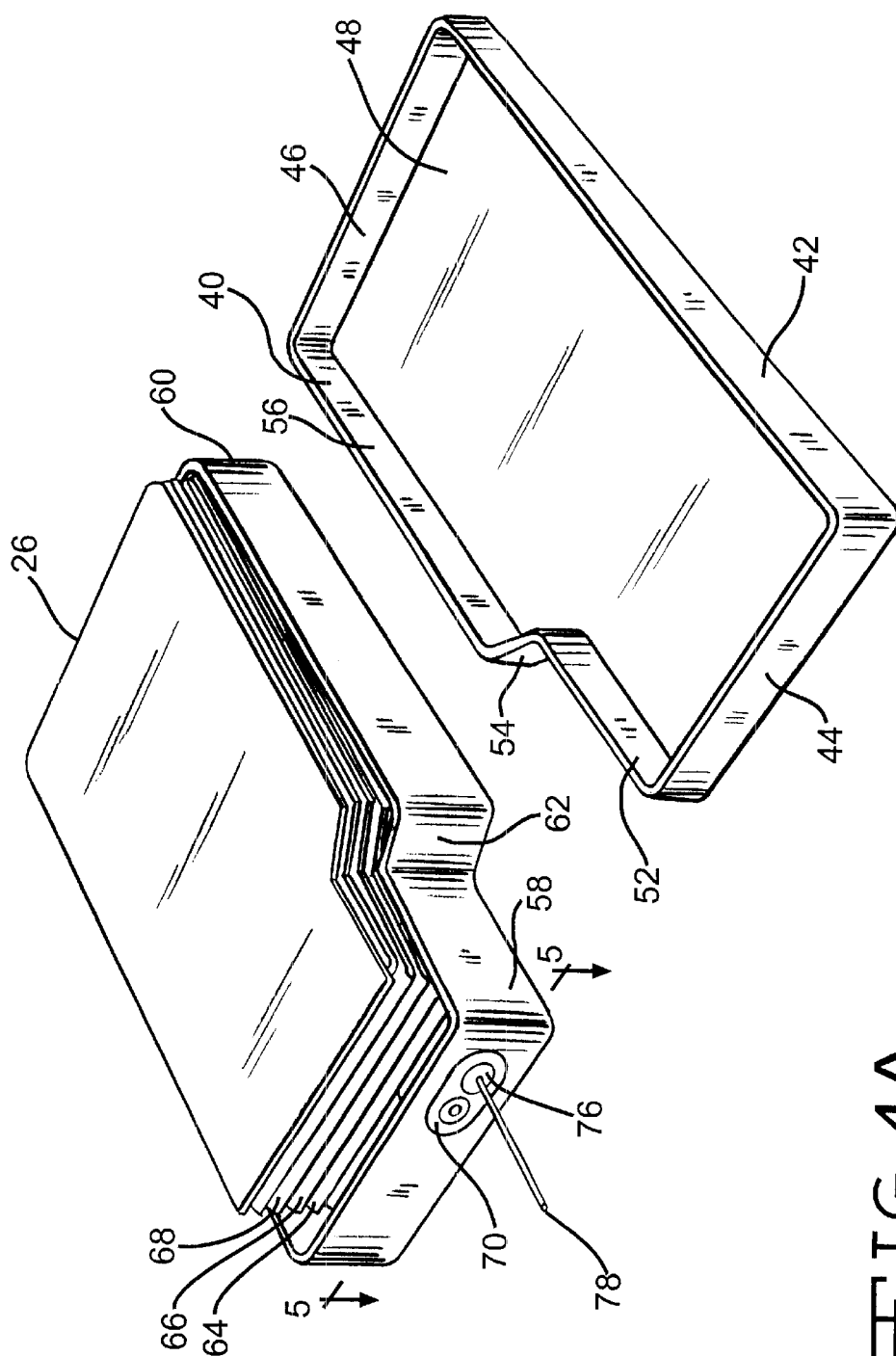
FIG. 4A is a perspective view of an embodiment of the clam shell battery casing with the lower portion containing the feed through assembly.
Figure 4B:
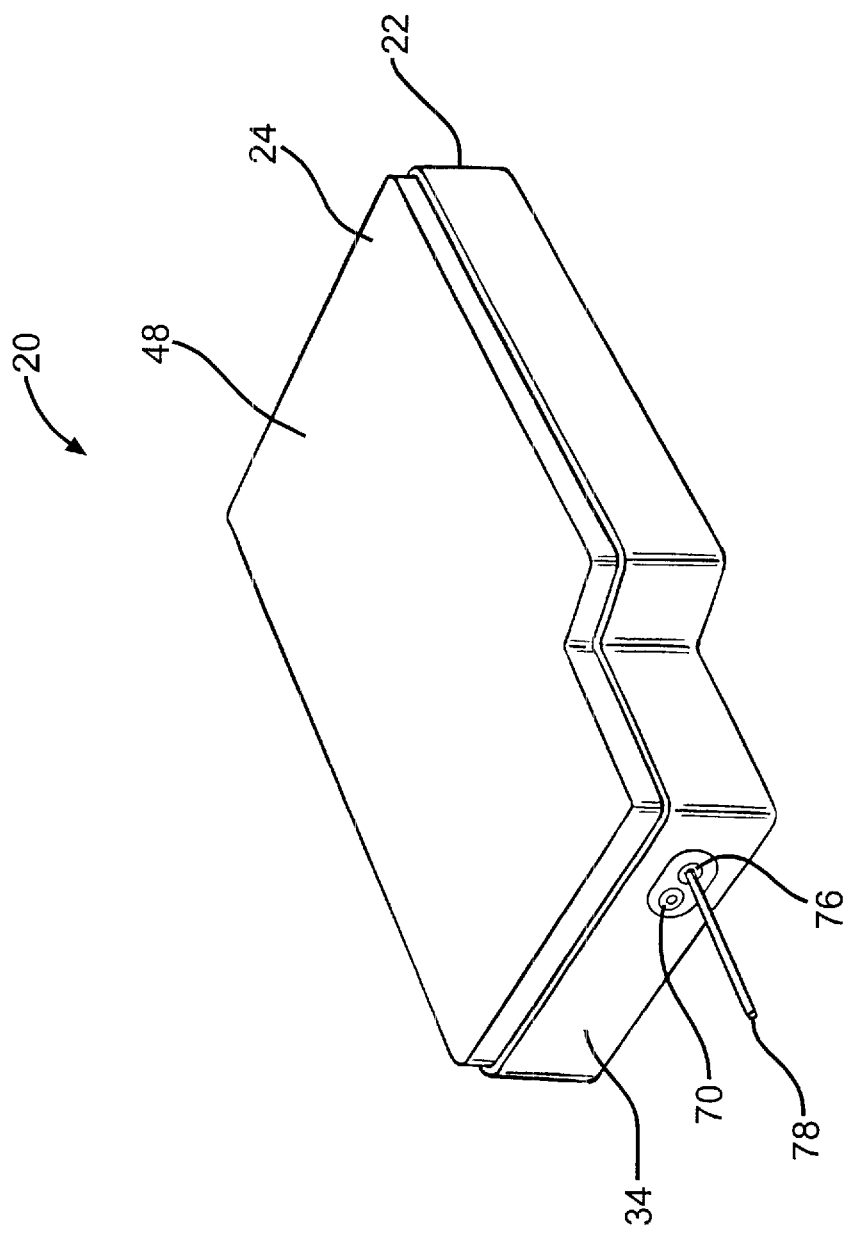
FIG. 4B is a perspective view of the battery case assembled prior to welding.

Turning now to the drawings, FIGS. 3, 4A and 4B illustrate an electrochemical cell 20 having a one-piece header assembly 70 according to the present invention. The header assembly 70 will be described in detail hereinafter. First, the cell 20 includes a conductive casing of metal 23, such as stainless steel, having first and second clam shell portions 22 and 24. As shown in FIG. 4B, the clam shell portions 22 and 24 are mated together and sealed about their periphery to provide a hermetic enclosure for an electrode assembly 26. The preferred methods of sealing are welding and brazing.

In particular, the first clam shell 22 comprises spaced apart side walls 28 and 30 extending to and meeting with spaced apart end walls 32 and 34. The side walls 28, 30 and the end walls 32, 34 meet each other at rounded corners and extend to a front wall 36. Opposite the front wall 36 is an continuous edge 38 of side walls 28, 30 and end walls 32, 34.

The second clam shell 24 comprises spaced apart side walls 40 and 42 extending to and connecting with spaced apart end walls 44 and 46. The side walls 40 and 42 and end walls 44 and 46 meet at rounded corners and extend to front wall 48. Opposite the front wall is a continuous edge 50 of the side walls 40 and 42 and end walls 44 and 46. End wall 46 has a greater length than end wall 44. In this manner, side wall 40 includes a first portion 52 extending from end wall 44 and forming into an angled side wall portion 54 which meets a second portion 56 of side wall 40 extending to the end wall 46.

In one preferred embodiment of the present invention shown in FIG. 4B, the second clam shell 24 is sized to fit inside the periphery of the first clam shell 26 in a closely spaced relationship. This means that side wall 42 is somewhat shorter than side wall 28, end wall 46 is somewhat shorter than end wall 32, side wall 40 is somewhat shorter than side wall 30 and end wall 44 is somewhat shorter than end wall 34. Also, the first and second portions 52 and 56 of side wall 40 are sized to be received inside the first and second portions 58 and 60 of side wall 30 with the intermediate angled side wall portion 54 of side wall 40 aligned with and received inside of the intermediate angled side wall portion 62 of side wall 30.

In the embodiment of the present invention as further shown in FIG. 4B, the second clam shell 24 is received and nested inside the first clam shell 22 in a closely spaced relationship. In that respect, the mating clam shells 24 and 22 of the present invention are stamped or otherwise formed from sheet metal to a shape desired for a particular application.

As shown in FIG. 4A, cell 26 further includes an anode electrode, generally designated 64. The anode electrode comprises an anode active material, such as lithium pressed to the opposite sides of an anode current collector. The anode current collector is fabricated from a thin sheet of metal such as nickel. The anode electrode 64 is in operative contact with a cathode plate 66 through a thin sheet of separator material 68. The separator surrounds and envelopes the cathode body 66 to prevent direct physical contact with the anode 64.

As shown in FIGS. 1, 2, 4A and 4B, the case further contains a one-piece header or lid assembly 70 of the present invention having an ellipsoidal shape and provided with first and second openings 72 and 74. The first opening 72 is used for a hermetically sealed battery terminal feedthrough 78 whereas the second opening 74 is used for an electrolyte fill opening. After filling the casing with electrolyte, a closure member 80 (FIG. 5) may be sealed therein using a laser welder 106.

Figure 1:
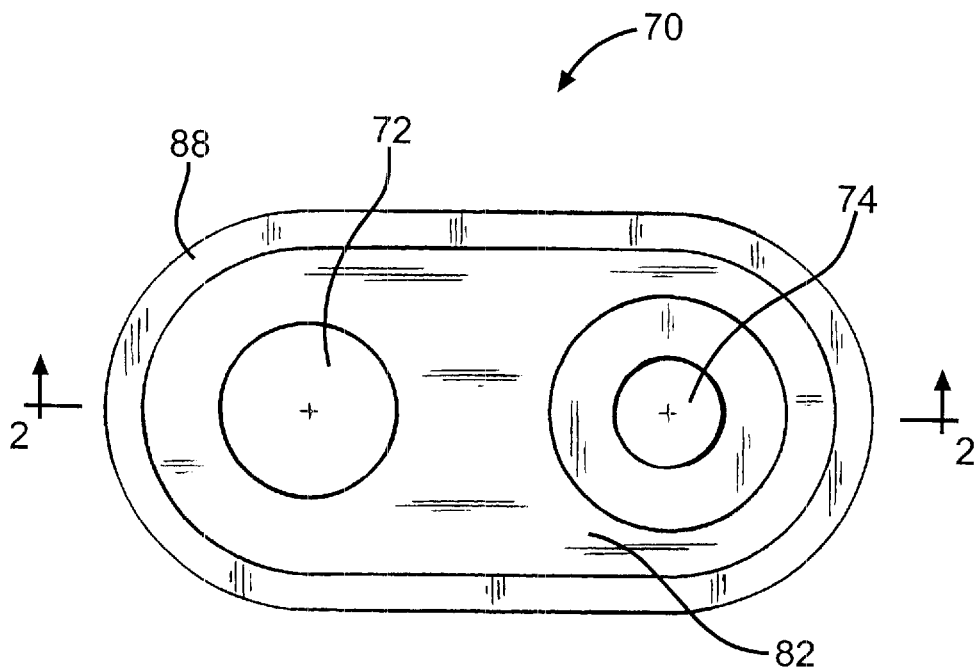
FIG. 1 is a plan view of the battery lid or header assembly of the present invention.
Figure 2:
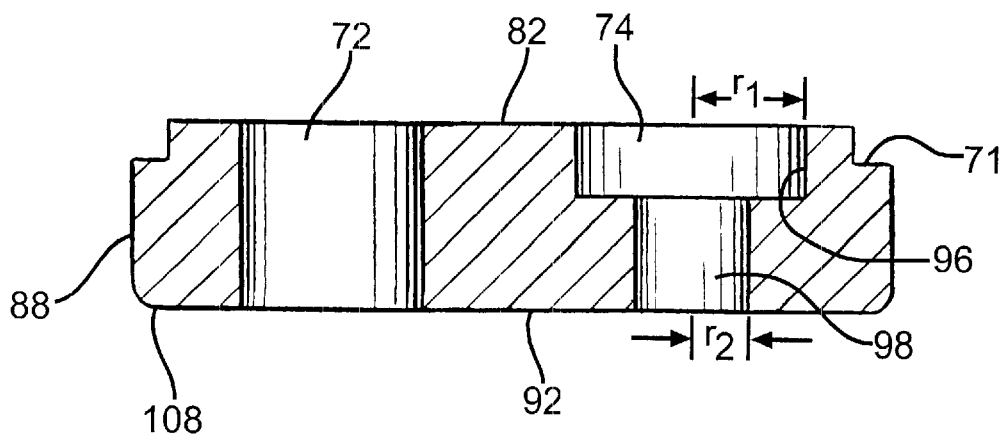
FIG. 2 is a section view of the assembly cut along line 2—2 in FIG. 1.

In FIGS. 1 and 2, the upper surface 82 of the header assembly 70 is surrounded by a step 71 extending to and meeting with a side wall 88. The side wall 88 meets with a lower surface 92 at a rounded edge. The purpose of the step 71 is to assist in locating the one-piece header assembly 70 in the side face 34 of the clam shell portion 22. The lower portion 108 of the assembly 70 acts as a heat sink and dissipates heat generated by welding or brazing of the assembly 70 in the clam shell halves 22 and 24. The welding method is shown in FIG. 7. As those skilled in the art can appreciate, the header assembly 70 can be installed in either the first or second, or possibly in both the first and second clam shell halves 22 and 24, depending on the design of the battery system. There can be a number of embodiments of the assembly location.

The dimension of the step 71 depends on the type and nature of the battery and the case used therein. In general, the vertical dimension of the step will be equal to the thickness of the battery case. As previously stated, the step 71 assists in the locating of the assembly in the wall of the battery casing. The step 71 maintains the assembly 70 in position whereby the upper surface 82 of the assembly is coplanar with the outer surface 33 of side wall 34, creating a smooth transition which may be necessary in certain battery designs.

The first opening 72 of the assembly 70, is further defined by a continuous cylindrical opening of fixed radius 94. In that respect, the opening 72 extends downwardly from the upper surface 82 and meets with lower surface 92. The continuous cylindrical opening is used for a battery terminal feedthrough, and contains glass-to-metal seal 76.

The second opening 74 is further defined by a discontinuous cylindrical aperture of fixed radius $r_1$ 96 extending downwardly from the top surface 82 to a point approximately midway between the top 82 and bottom surface 92 where the opening passes through a transition 95 to a cylindrical 98 opening of radius $r_2$ (where $r_1 > r_2$) extending further downward and meeting with the lower surface 92. The first and second openings 72 and 74 are co-axial.

It is not necessary that the joinder of aperture surfaces 94, 96 and 98 of the upper and lower surfaces 82 and 92 be rounded, since as those who are skilled in the art realize, different forms of manufacturing of the metallic component 70 will produce varied surface finishes. The one-piece header assembly 70 can be manufactured by machining, powdered metallurgy, or by stamping. However, a sharp transition is necessary in the second opening 74 where the first cylindrical aperture 96 constricts to the second cylindrical aperture 98 since the fill port may be sealed by using a spot laser weld (not shown). For an alternate closure structure, reference is drawn to U.S. Pat. Nos. 5,776,632 and 6,117,195, both to Honegger, the disclosures of which are incorporated herein by reference.

Leakage of electrolyte and gases from an electrochemical cell caused by a compromised seal is extremely undesirable, and can even be fatal when the cell is used as the power source for an implantable medical device, and the like. In electrochemical cells having a metal casing, one means of providing a hermetic seal, as previously stated, for an electrolyte fill opening and the like, is by welding a seal member 80 in the casing. However, the casing proximate to the weld conducts heat to the electrolyte contained therein and some electrolyte evaporation invariably occurs. When these gases escape from the cell casing they are referred to as out gassed by-products and such escaping gases leave pinholes in the weld, thereby compromising hermeticity.

Figure 8A:
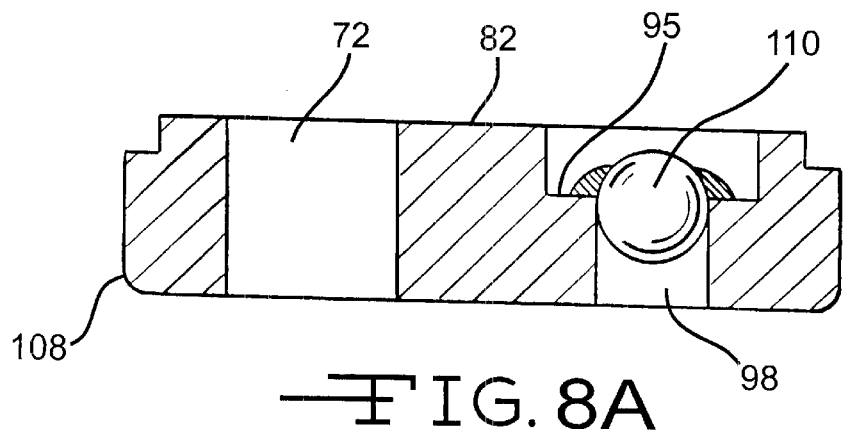
FIG. 8A depicts the first embodiment of the seal closure for the fill port.

Thus, in the current invention, several embodiments of the seal 80 may be effective to close the fill aperture 74 and assist to prevent compromise of the seal. In the first embodiment, a metal sealing member 110 is inserted in the second opening (FIG. 8A) wherein the member is flush with or slightly lower than upper surface 82 and is force fit into the sealing registry of the electrolyte fill opening 74 to form a secondary seal until such time as the primary seal is formed by sealing the round metal member 110 to the transition 95 about the midpoint of the fill aperture 74.

Figure 8B:
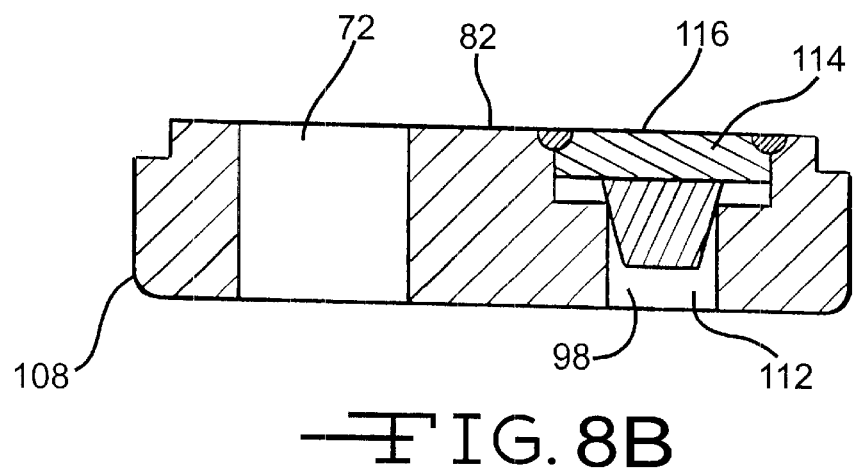
FIG. 8B depicts the second embodiment of the seal closure for the fill port.

In the second embodiment of the closure, a metal sealing member 112 (FIG. 8B) is fit into the lower portion of the fill aperture, surrounded by cylindrical opening 98. A second layer sealing member 114 is installed in the upper aperture 96 slightly smaller than $r_1$, the radius of the upper portion 96 of opening 74, wherein the outwardly facing portion 116 of the second sealing member 114 is flush or slightly recessed with the side wall surrounding the fill opening. The member 116 is sealed to the upper surface 82 of the assembly 70.

Figure 8C:
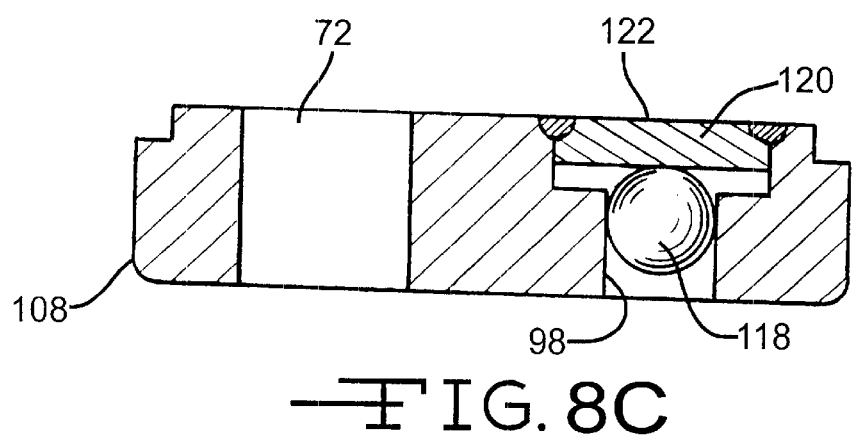
FIG. 8C depicts the third embodiment of the seal closure for the fill port.

In the third embodiment of the closure, a metal sealing member 118 (FIG. 8C) is fit into the lower portion of the fill aperture, surrounded by cylindrical opening 98. A second layer sealing member 120 is installed in the upper aperture 96 slightly smaller than $r_1$, the radius of the upper portion 96 of opening 74, wherein the outwardly facing portion 122 of the second sealing member 120 is flush or slightly recessed with the side wall surrounding the fill opening. The member 120 is sealed to the upper surface 82 of the assembly 70.

Figure 5:
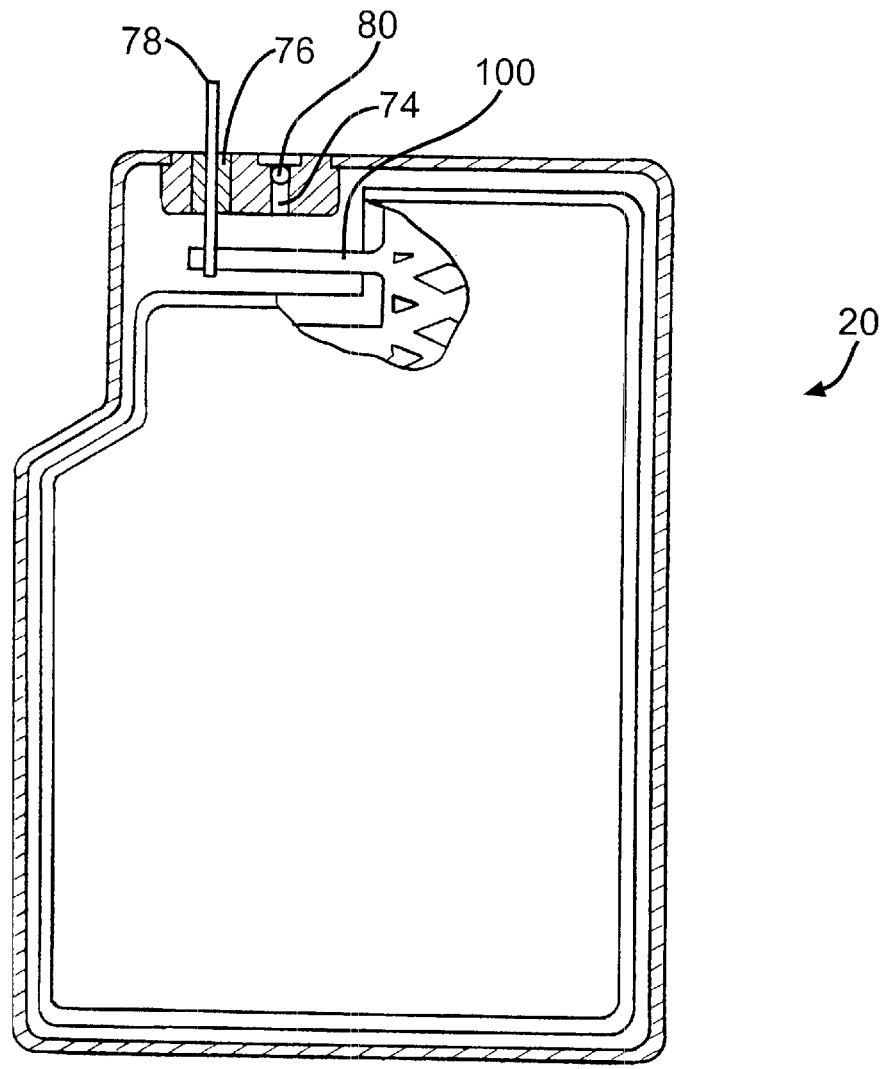
FIG. 5 is a sectional view of the lower half of the battery casing cut along line 5—5 in FIG. 4A showing the connection of the cathode to the collection plate.

Now in FIG. 5, the terminal lead 78 of the electrochemical cell 20 connected to the cathode current collector 100 extends through the glass-to-metal seal 76 fitted in the header assembly 70 supported in the wall 34 of clam shell 22. Lead 78 is the positive electrical terminal, being connected to the cathode electrode 66. The anode electrode 64 is in operative contact with the conductive casing through direct physical contact of the anode active material with the clam shells 22, 24.

For a typical lithium/silver vanadium oxide cell, the cathode current collector is of titanium and terminal lead 78 is of molybdenum, and separators 68 are polypropylene. The activating electrolyte is a 1.0M to 1.4M solution of $LiAsF_6$ or $LiPF_6$ in a 50:50 mixture of, by volume, 1,2-dimethoxyethane and propylene carbonate. Glass seal 76 is of TA-23 Hermetic sealing glass, while the casing clam shells 22, 24 may be of stainless steel, or other metals. This electrochemical system is of a primary cell type. However, those skilled in the art will readily recognize that the casing of the present invention is readily adapted to house both primary electrochemical systems of either a solid cathode or liquid catholyte type, or a secondary cell such as a lithium ion cell having a carbonaceous negative electrode and lithium cobalt oxide positive electrode. Other active and non-active materials may be used for other cell chemistries, as are well known by those skilled in the art.

Now use of the two stamped metal component configuration for the manufacture of the implantable grade lithium anode based electrochemical cells permits optimum utilization of available volume in an implantable medical device, yielding greater packaging efficiencies in smaller devices. The result is a highly efficient power source. Heretofore, the manufacturing process required many more steps to create a hermetically sealed cell capable of being implanted. The invention will enhance the art by decreasing manufacturing costs.

To manufacture the case it is necessary to appropriate the proper sheet thickness conductive metal and draw the individual halves by stamping or other such suitable means. The peripheral edges need to be trimmed, ensuring weld-ready continuous peripheral edges. The glass-metal seal with terminal lead 76 is installed in the first opening 72 of the one-piece header assembly 70, and the assembly is installed in the lower clam shell half 22 and welded using a laser light 104 generated by the laser 106 (FIG. 7). The electrode assembly is installed in the shell 22 that is then mated with the second clam shell 24. The edges of the mated clam shells 22, 24 form a continuous peripheral surface, which, as previously described, is sealed by welding. The assembled casing housing the electrode assembly is then filled with an electrolyte and the second fill opening 74 is closed with the closure assembly 80. The remaining portion of the one piece assembly 70 is welded at the same time. This creates a hermetically sealed electrochemical cell assembly.

Figure 6:
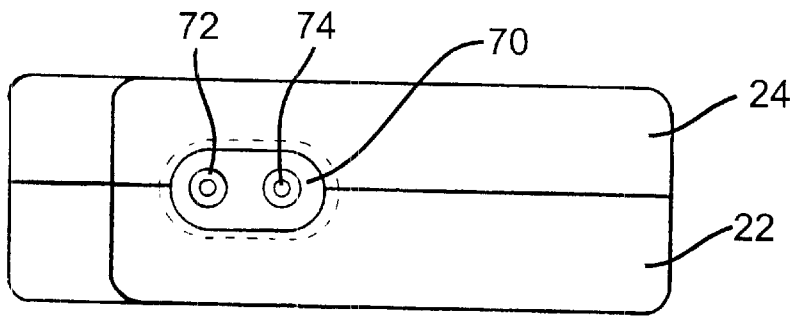
FIG. 6 shows a plan view of an embodiment of the battery case containing the header assembly.

In practice, the clam shell halves provide access from "inside" the casing so that the header is moved up and into the broader opening in the clam shells. This means that one or the other of the clam shell portions, or both of them (FIG. 6), are provided with an opening sized to receive the step 71 of the header in a closely spaced relationship. The step 71 directly proximate the side wall 88 contacts the underside of one or the other of the walls 22 and 24, or both of them, as the case may be. In that manner, the step 71 serves as a locating structure for precisely and accurately positioning the header in the header opening. Further, the header is of a sufficient thickness to support the GMTS and the closure for the fill opening.

While the present one piece header assembly has been described with respect to a clam shell casing design, that is for illustrative purposes only. In a broader sense, the present header is useful with any casing designs including prismatic, cylindrical and button shapes which afford access to the inside of the casing other than through the opening intended to receive the header. For example, U.S. Pat. No. 5,474,859 to Takeuchi et al., which is assigned to the assignee of the present invention and incorporated herein by reference, describes a cell housed in a cylindrical casing having a bottom wall and an upper lid or cover. The header of the present invention is useful with this type of cylindrical casing.

While preferred embodiments of the present invention have been disclosed, it will be appreciated that it is not limited thereto, but may be otherwise embodied with the scope of the following claims.

I claim:

1. An electrochemical cell, which comprises:
   a) an anode;
   b) a cathode;
   c) an electrolyte activating the anode in electrochemical association with the cathode;
   d) a first casing member having a first surrounding side wall extending to and meeting with a first major face wall;
   e) a header secured in a casing opening provided in the first casing member, the casing opening sized to receive the header without the header being capable of completely moving through the casing opening, wherein the header has at least one header opening; and
   f) a second casing member having a second surrounding side wall extending to and meeting with a second major face wall, wherein the first casing member and the second casing member are matable to each other with a portion of one of the first and second surrounding side walls in an overlapping, contact relationship with at least a portion of the other surrounding side wall for securing the first and second casing members together, thereby enabling them to house the anode, the cathode and the electrolyte contained therein with a portion of the header being accessible from outside the first casing member mated to the second casing member and wherein the at least one header opening provides for passage of a terminal lead therethrough or for providing the electrolyte into the casing.

2. The electrochemical cell of claim 1 wherein the header includes a glass-to-metal seal opening and an electrolyte fill opening.

3. The electrochemical cell of claim 1 wherein an upper surface of the header is flush or somewhat recessed with respect to an outer surface of the first casing member.

4. The electrochemical cell of claim 1 wherein the header has a surrounding step that fits in the casing opening and prevents the header from completely moving therethrough.

5. The eletrochemical cell of claim 1 wherein the header has an ellipsoidal shape.

6. An electrochemical cell, which comprises:
   a) an anode;
   b) a cathode;
   c) an electrolyte activating the anode in electrochemical association with the cathode; and
   d) a casing housing the anode, the cathode, and the activating electrolyte, wherein the casing comprises:
      i) a first casing member having a first surrounding side wall extending to and meeting with a first major face wall;
      ii) a second casing member having a second surrounding side wall extending to and meeting with a second major face wall, wherein the first casing member and the second casing member are matable to each other with a portion of the first surrounding side wall in an overlapping, contact relationship with at least a portion of the second surrounding side wall for securing the first and second casing members together, thereby enabling the casing to house the anode, the cathode and the electrolyte contained therein; and
      iii) a header secured in a casing opening provided in at least one of the first and the second casing members, the casing opening sized to receive the header before the first casing member is mated to the second casing member without the header being capable of completely moving through the casing opening and with a portion of the header being accessible from outside the casing after the first casing member is mated to the second casing member, wherein the header has at least one header opening that provides for passage of a terminal lead therethrough or for providing the electrolyte into the casing.

7. The electrochemical cell of claim 6 wherein the header is made of metal.

8. The electrochemical cell of claim 7 wherein the header includes a glass-to-metal seal opening for a terminal lead and an electrolyte fill opening.

9. The electrochemical cell of claim 8 further comprising a seal provided in the fill opening after the electrolyte activates the anode and the cathode.

10. The electrochemical cell of claim 6 wherein the header is secured in the casing opening by welding or brazing.

11. The electrochemical cell of claim 6 of either a primary or a secondary chemistry.

12. The electrochemical cell of claim 6 wherein the first and the second casing members are of a metal material.

13. The electrochemical cell of claim 6 wherein the header has a surrounding step that fits in the casing opening and prevents the header from completely moving there through.

14. The electrochemical cell of claim 6 wherein the header has an ellipsoidal shape.

15. An electrochemical cell, which comprises:
   a) an anode;
   b) a cathode;
   c) an electrolyte activating the anode in electrochemical association with the cathode; and
   d) a casing housing the anode and the cathode, wherein the casing comprises:
      i) a first metal casing portion having a first surrounding side wall extending to and meeting with a first major face wall;
      ii) a second metal casing portion having a second surrounding side wall extending to and meeting with a second major face wall; and
      iii) a header sealed in an opening in at least one of the first and second casing portions.

* * * * *